United States Patent
Tovinkere et al.

(10) Patent No.: US 6,678,635 B2
(45) Date of Patent: Jan. 13, 2004

(54) METHOD AND SYSTEM FOR DETECTING SEMANTIC EVENTS

(75) Inventors: Vasanth R. Tovinkere, Portland, OR (US); Eugene Epshteyn, Hillsboro, OR (US); Richard J. Qian, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 09/766,594

(22) Filed: Jan. 23, 2001

(65) Prior Publication Data

US 2002/0099518 A1 Jul. 25, 2002

(51) Int. Cl.$^7$ ................................................ G06F 17/00
(52) U.S. Cl. ........................ 702/179; 702/181; 702/176; 345/721
(58) Field of Search ................................ 702/176–181, 702/183, 186–188, FOR 103, FOR 104, FOR 114, FOR 134, FOR 135, FOR 139, FOR 154, FOR 170; 706/15, 20, 21, 8, 1, 26, 31, 45–48, 50, 52, 55, 58, 900, 16, 23, 25; 703/2, 3; 707/3–6, 500.1, 501.1; 386/68, 69, 111; 348/157, 155, 135; 725/45, 46; 343/719–721; 382/103, 155, 156, 159; 704/232, 255, 259; 273/259, 277; 434/251, 257

(56) References Cited

U.S. PATENT DOCUMENTS

| | | | | |
|---|---|---|---|---|
| 5,574,845 A | * | 11/1996 | Benson et al. | 345/418 |
| 5,828,809 A | * | 10/1998 | Chang et al. | 386/69 |
| 5,969,755 A | * | 10/1999 | Courtney | 348/143 |
| 6,182,069 B1 | * | 1/2001 | Niblack et al. | 707/6 |
| 6,253,195 B1 | * | 6/2001 | Hudis et al. | 707/2 |
| 6,263,335 B1 | * | 7/2001 | Paik et al. | 707/5 |
| 6,441,846 B1 | * | 8/2002 | Carlbom et al. | 348/169 |
| 2002/0059584 A1 | * | 5/2002 | Ferman et al. | 725/34 |
| 2002/0157116 A1 | * | 10/2002 | Jasinschi | 725/136 |

OTHER PUBLICATIONS

Dagtas et al., "Models for Motion–Based Video Indexing and Retrieval", Jan. 2000, IEEE Transactions on Image Processing, vol. 9, No. 1, pp. 88–101.*

Day et al., "Spatio–Temporal Modeling of Video Data for On–Line Object–Oriented Query Processing", May 15–18, 1995, IEEE, Proceedings of the International Conference on Multimedia Computing and Systems, 1995, pp. 98–105.*

* cited by examiner

*Primary Examiner*—Hal Wachsman
(74) *Attorney, Agent, or Firm*—Pillsbury Winthrop LLP

(57) ABSTRACT

A method and system is provided for detecting occurrences of semantic temporal events based on observations extracted from input data and event models. The input data is fed into the system from some data source. Based on specified event to be detected, multiple-layer models corresponding to the event are retrieved. The models are used to determine the types of temporal observations to be extracted from the input data. The extracted temporal observations are then used, in combination with the multiple-layer models of the event, to detect the occurrences of the event.

20 Claims, 15 Drawing Sheets

METHOD AND SYSTEM FOR DETECTING SEMANTIC EVENTS

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

1. Field of the Invention

Aspects of the present invention relate to the field of detecting semantics from temporal data. Other aspects of the present invention relate to a method and system that identifies meaningful events from temporal data based on event models.

2. General Background and Related Art

Recent technical advances are enabling more and more data being recorded, stored, and delivered over Internet Protocol (IP). Data acquisition devices such as cameras are becoming commodities with low cost yet high quality. Disk storage technology is riding a Moore's law curve and is currently at a dollar-per-megabyte point that makes huge digital content archive practical. Optical network and cable modems are bringing megabit bandwidth to offices and homes. Selective delivery of content is, however, less well established yet often necessary and desirable.

Selective delivery of content largely depends on whether the content is understood and properly indexed. When well understood content and its indexing become available, selective delivery can be accomplished by developing systems that use indices to select appropriate segments of content and to transmit such segments to where the content is requested. Conventionally, content indexing is performed manually. With the explosion of information, manual approach is no longer feasible.

Various automated methods emerged over the years to index content. For example, for text data, words can be detected automatically and then used for indexing purposes. With the advancement in multimedia, data is no longer limited to text. Video and audio data have nowadays become ubiquitous and preferred. Understanding the content embedded in such media data requires understanding both the intrinsic signal properties of different semantics as well as the high level knowledge (such as common sense) about various semantics. For example, a goal event in a soccer game may be simultaneously seen and heard from recorded video and audio data. To detect such a semantic event, common sense prompts us that a goal event is usually accompanied by crowd cheering. Yet automated recognition of crowd cheering from recorded digital data can be achieved only when the acoustic properties of crowd cheering can be understood and properly characterized.

Automatically establishing indices for such media data is difficult. Existing approaches for detecting semantic event usually hard-wire high level knowledge into a system. Most of such systems employ inference mechanisms but with a fixed set of inference methods. When semantic event models are used for detection, they are often built based on the snap-shots of the underlying events. For a temporal semantic event (which often is the case), such snap-shot based event models fail to capture the temporal properties of the events.

As a result of the above mentioned limitations of existing approaches, systems developed using such approaches can detect only a few special types of events. Detection of complex events often requires human intervention. The existing methods, therefore, can not meet the challenges of rapidly and automatically indexing huge volume of data.

What is needed is a semantic event detection method and system that is able to dynamically invoke high level domain knowledge from hierarchical event models and to automatically detect a wide range of complex temporal events and actions using pluggable probabilistic inference modules.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

Figure 1:
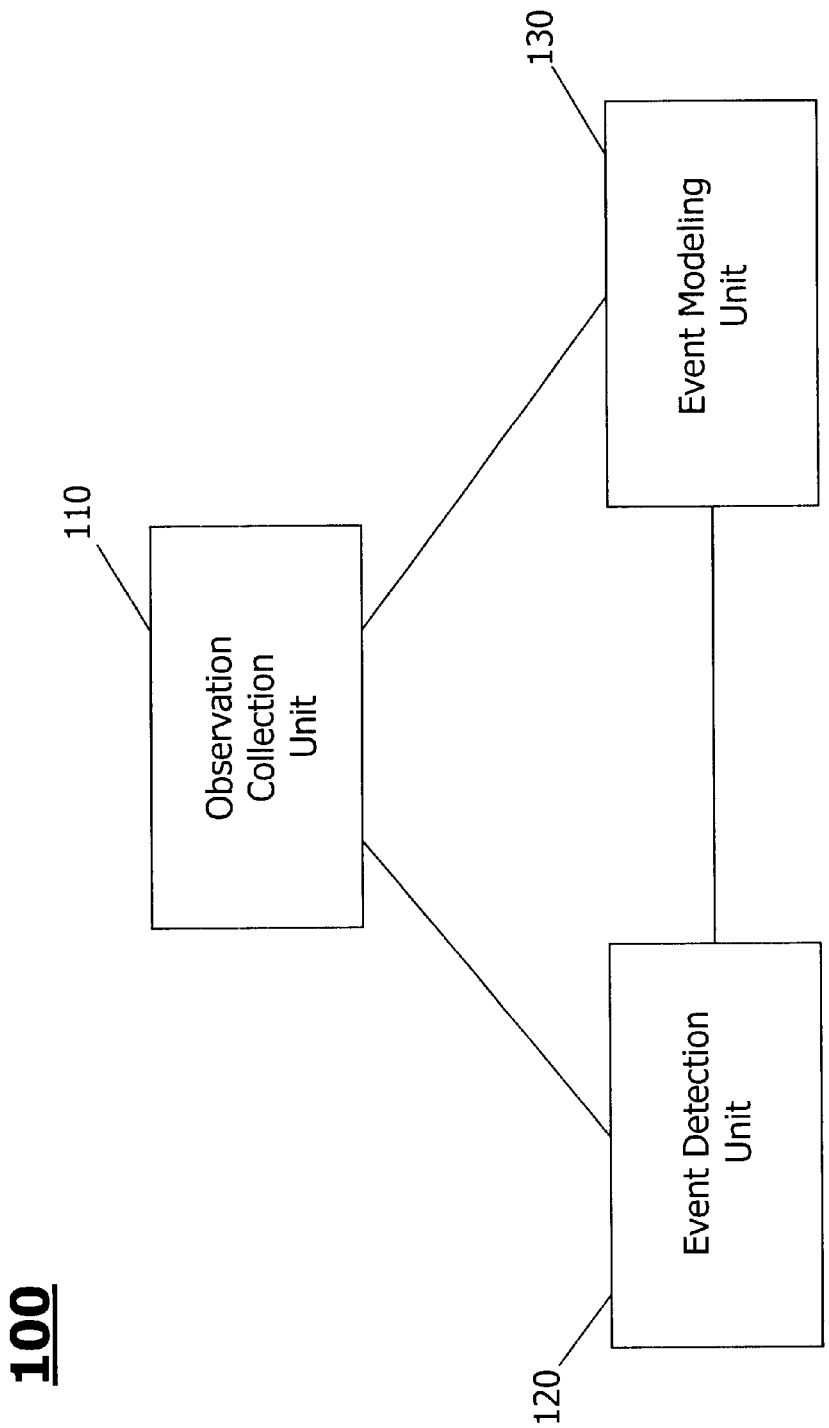
FIG. 1 is a high level block diagram of an embodiment of the present invention, in which the framework of an event detection system is shown.

An embodiment of the invention is illustrated that is consistent with the principles of the present invention and that addresses the need identified above to automatically detect temporal semantic events based on given observation data and hierarchical event models. FIG. 1 is a high level block diagram of an event detection system 100, which comprises an observation collection unit 110, an event modeling unit 130, and an event detection unit 120. In FIG.

1, observation collection unit 110 feeds relevant observations to event detection unit 120. Event modeling unit 130 generates models for various events and stores the models so that they can be retrieved for event detection purposes. Event detection unit 120 takes the observations from observation collection unit 120 as input and detects events based on the corresponding models of the events, retrieved from event modeling unit 130.

Observation collection unit 110 generates relevant observation data based on the data from one or more data sources. A data source may be a data acquisition device such as a camera, a microwave sensor, or an acoustic recorder. A data source may also be a data stream, sent to observation collection unit 110 through a, for example, network connection. A data stream may be a single media stream, such as an audio stream, or a multimedia stream, such as a video stream with synchronized audio track and closed captions. Observation collection unit 110 may be simultaneously connected to more than one data sources. For example, unit 110 may be connected to a plurality of cameras, a microwave sensor, and an acoustic recorder.

The data from a data source is raw. Raw data may or may not be directly useful for event detection purposes. Observation collection unit 110 may extract useful observations from the raw data. For example, observation collection unit 110 may extract a set of acoustic features from an audio data stream and send those features, as observation data, to event detection unit 120 to detect the speech segments of a particular speaker.

The observations generated by collection unit 110 may be features in spatial, temporal, or frequency domains, or in a combined domain such as spatial plus temporal. For instance, a set of feature points extracted from a two-dimensional image are spatial features. A series of microwave readings along time form temporal observations. A set of image features tracked along time in a video clip are combined spatial/temporal observations.

Event modeling unit 130 generates event models that are used in detecting underlying events. An event model may be, for instance, built in the form of a decision tree, in which each node in the tree represents a decision point and each such decision point may involve some conditions measured based on a set of observations. It may be appreciated that the preferred embodiment of the present invention may also employ event models in different forms. For example, an event model built for detecting a particular speaker may be generated in the form of a Probability Distribution Function (PDF) based on the acoustic characteristics of the speaker.

An event model is used for both representing an event and for detecting the event. Event models, stored in event modeling unit 130, are retrieved by event detection unit 120 for detection purposes. Based on the observation data from unit 110, event detection unit 120 identifies events using corresponding event models. There is a correspondence between the observations from collection unit 110 and the event models from event modeling unit 130. For example, if an event model is a decision tree and each of the decision node in the tree involve some conditional decisions made based on different observations. To use this model to detect events, collection unit 110 has to supply the observations needed to make detection decisions at various tree nodes.

Observation collection unit 110 generates observations that are relevant and useful for detecting events. The relevance of the observations to the detection is specified or determined by the corresponding event models. For example, if an event model is built based on some spatial-temporal features such as location and time and is used for detecting the occurrences of the corresponding event, observations based on which the detection is performed may necessarily be the positions of the objects involved in the occurrences of the event. For each particular type of event, observation collection unit 110 produces observations according to the model of the event, stored in event modeling unit 130. Therefore, observation unit 110 is related to event modeling unit 130 by collecting observations based on event models. That is, the event models stored in event modeling unit 130 dictate both the observation collection unit 110 and the event detection unit 120.

Figure 2:
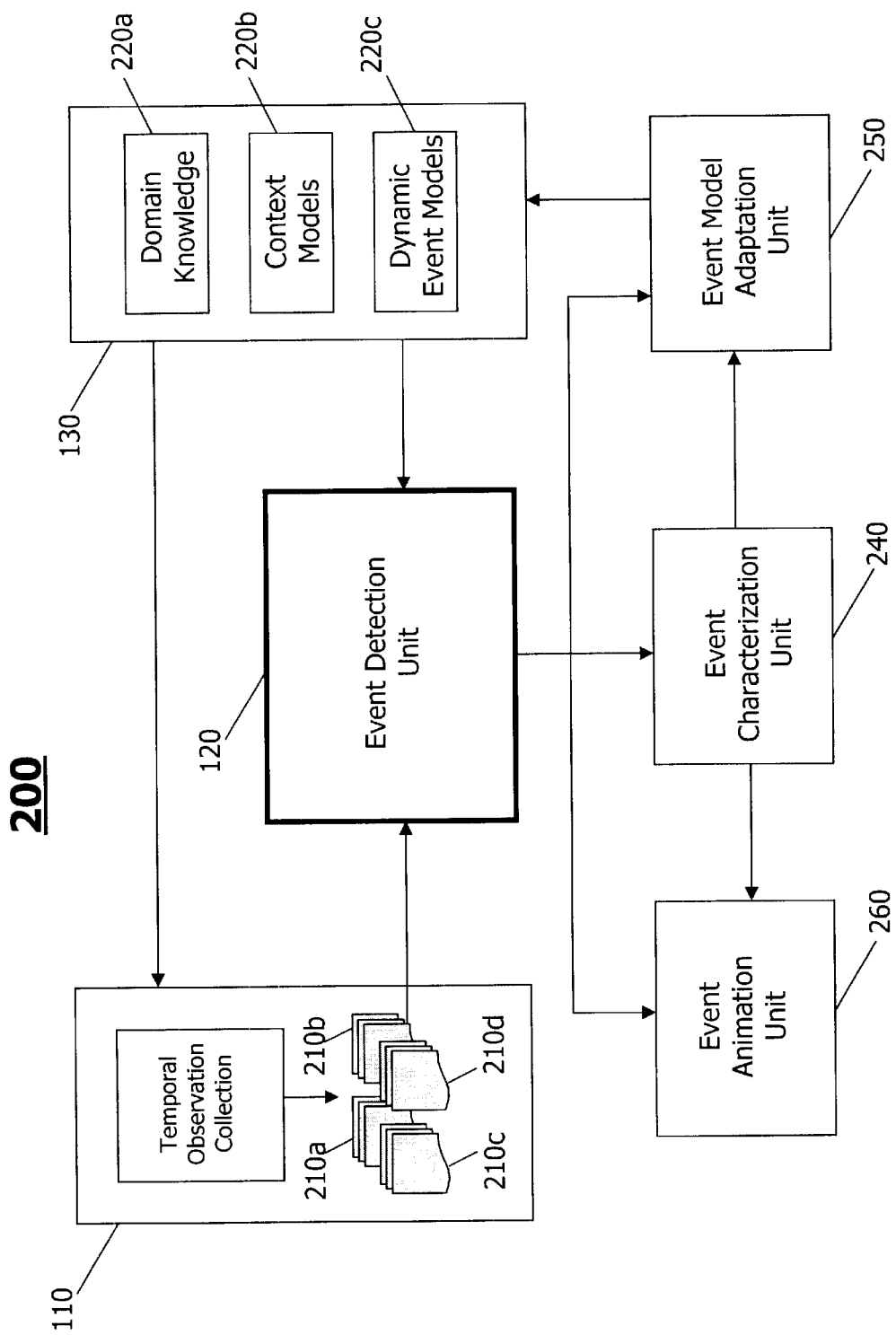
FIG. 2 is a high level block diagram of an expanded framework of an event detection system.

The relationships among unit 110, 120, and 130 are described in more detail in FIG. 2. In FIG. 2, observation collection unit 110 generates a plurality of temporal observation series 210a, 210b, 210c, and 210d. Event modeling unit 130 may comprise the event models at different levels of abstraction. For example, the domain knowledge 220a, the context models 220b, and the dynamic event models 220c in FIG. 2 may form a hierarchy of models for underlying events. Models at different levels of the hierarchy may be used for different inference purposes.

Domain knowledge 220a models domain specific information of an event. For example, for a sports game event, such as a goal event in a soccer game, the domain specific information may be about the rules in a soccer game. Context models 220b captures contextual information. For instance, for a sports event in a soccer game, contextual information may specify the beginning of a new period. Dynamic event models 220c describes the characteristics of an event which may include the descriptions in spatial, frequency, and temporal domains. A dynamic model for an event may also be hierarchical. For example, a spatial event such as a particular sports player or player number 101 may be modeled as a decision tree. In such a decision tree, the sports player may be modeled as a motion blob represented by the top node of the tree. The motion blob may be specified as having two properties, represented as two children of the top node. One child may be a node representing number 101 (corresponding to the player's number printed on the shirt) and the other may be a node representing a blue patch within the motion blob (corresponding to the color of the shorts the player wears). Further, the node representing number 101 may have a child node representing a yellow blob (corresponding to the color of the shirt that player wears).

A spatial/temporal event may be modeled as a series of, along time, spatial models, each modeling the event at one time instance, and together they form a spatial/temporal model for the event. Therefore, while 220a, 220b, and 220c may form a hierarchy of models for an event, 220c alone may contain an internal hierarchy of models. The distinction between 220c and the other two 220a and 220b may be that the latter captures only static information.

Event detection unit 120 applies event models, which may be some or all of 220a, 220b, and 220c, to identify events based on given observations, which may be some or all of 210a, 210b, 210c, and 210d. The details about event detection unit 120 will be further discussed later in referring to FIGS. 6, 7, 8, and 9.

Detected events may be further analyzed by event characterization unit 240. Such characterization may include deriving statistics about the occurrences of a particular type of event. For example, the average rate of scoring a goal with respect to a particular player in a particular season may be computed based on all the goal events detected from the recorded videos of the games played in the season. Such statistics may be used by event model adaptation unit 250 to update event models.

Event characterization unit 240 may also generate descriptions about certain actions occurred in detected events. For example, based on detected goal events in a soccer game, event characterization unit 240 may conclude that a particular player kicked the ball using his left foot. Such descriptions may be used, together with the detected events, by event animation unit 260 to generate the animation of detected events or actions.

Events detected by event detection unit 120 may also be used directly by event model adaptation unit 250 to dynamically update event models.

Figure 3:
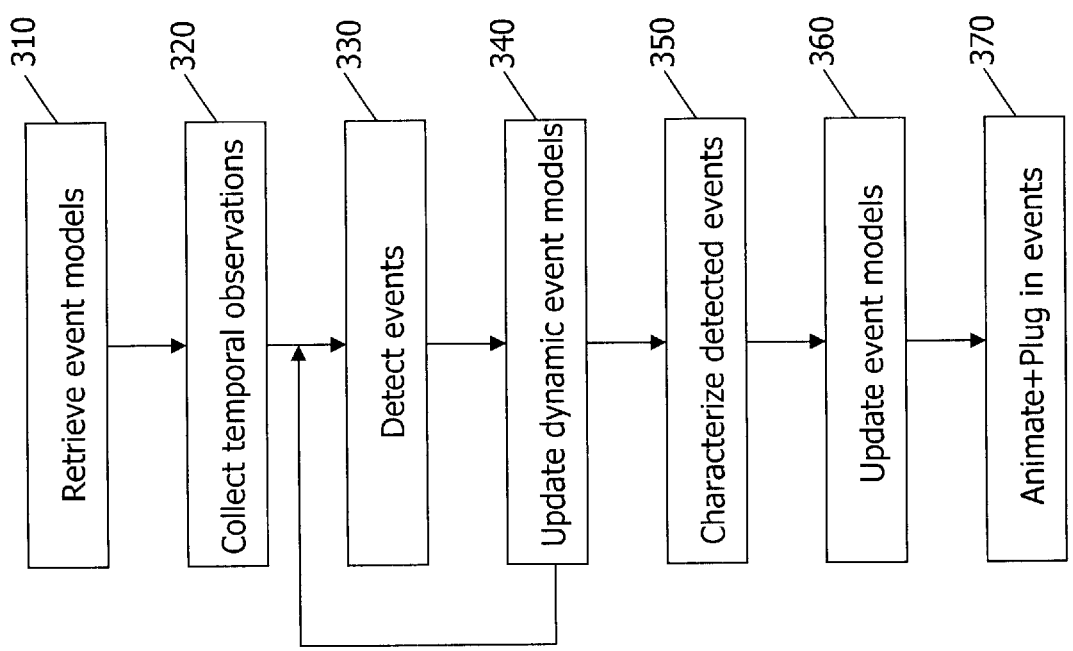
FIG. 3 is an exemplary flowchart of the expanded event detection system.

FIG. 3 shows an exemplary flowchart for event detection system 100. Hierarchical event models are retrieved at act 310 by event detection unit 120. Temporal observations that are relevant to the detection are extracted at act 320 by observation collection unit 110 and sent to event detection unit 120. Based on both the observations and the hierarchical event models, event detection unit 120 identifies the events at act 330. Such detection may be continuous along time. Detected events may be used at act 340 to dynamically update the event models. Acts 330 and 340 may repeat until the end of detection.

The loop between act 330 and 340 may yield zero or more occurrences of the underlying event. For example, if an underlying event is a goal event in a soccer game and the input data to event detection system 100 is a video recording of an entire game, multiple occurrences of the goal event may be detected from the game recording. A collective of event occurrences is analyzed at act 350 by event characterization unit 240 to generate the characterization of the events detected from a data stream. Such characterization may comprise various statistics about the occurrences of the event such as the distribution of the occurrences along time axis. Another example may be the correlation between the event and the conditions under which the event occurred. For instance, a goal event may occur under different situations such as which player scored the goal. It may be beneficial to compute the percentage of each player on a team scoring a goal.

The characterization may also include descriptions about certain interesting actions occurred during the event. For example, in a sports event such as soccer, certain player may have consistently scored goal from the left side of the field. Capturing such information may be important for various reasons such as animation.

The characterization may be used at act 360 to update an event model. For example, if a current goal event model describes that there is a high probability that a goal event will occur when certain player is on the right side of the field. This model may be built based on the past experience. If the player has significantly improved his skill to achieve goal from left side of the field and various occurrences during competitions have shown that the probability for him to score a goal from left side is now actually larger than from the right side, the model needs to be updated. The new probability may be extracted from characterization unit 240 and used to update event models.

Figure 4:
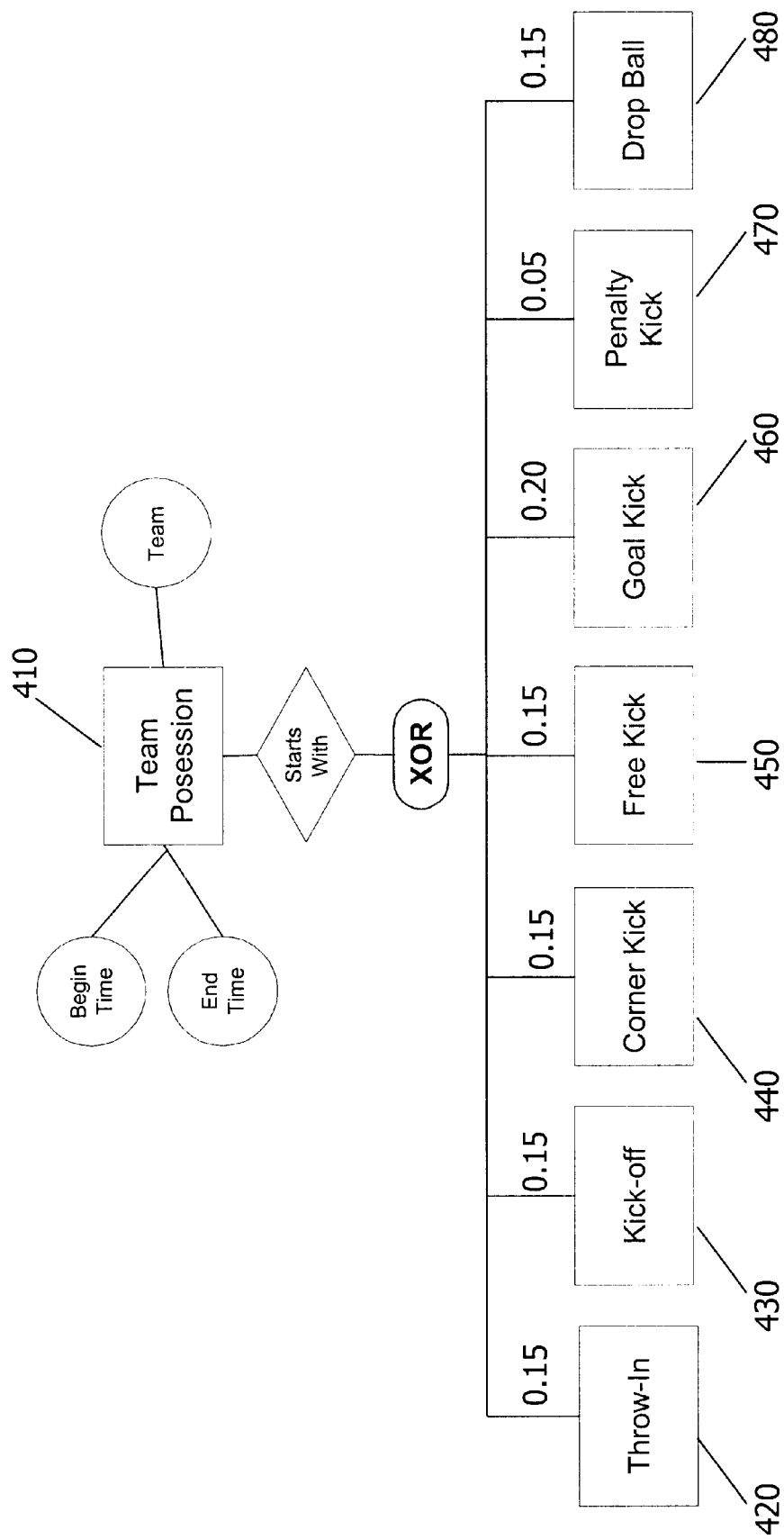
FIG. 4 shows an exemplary event model represented by an entity graph.
Figure 5:
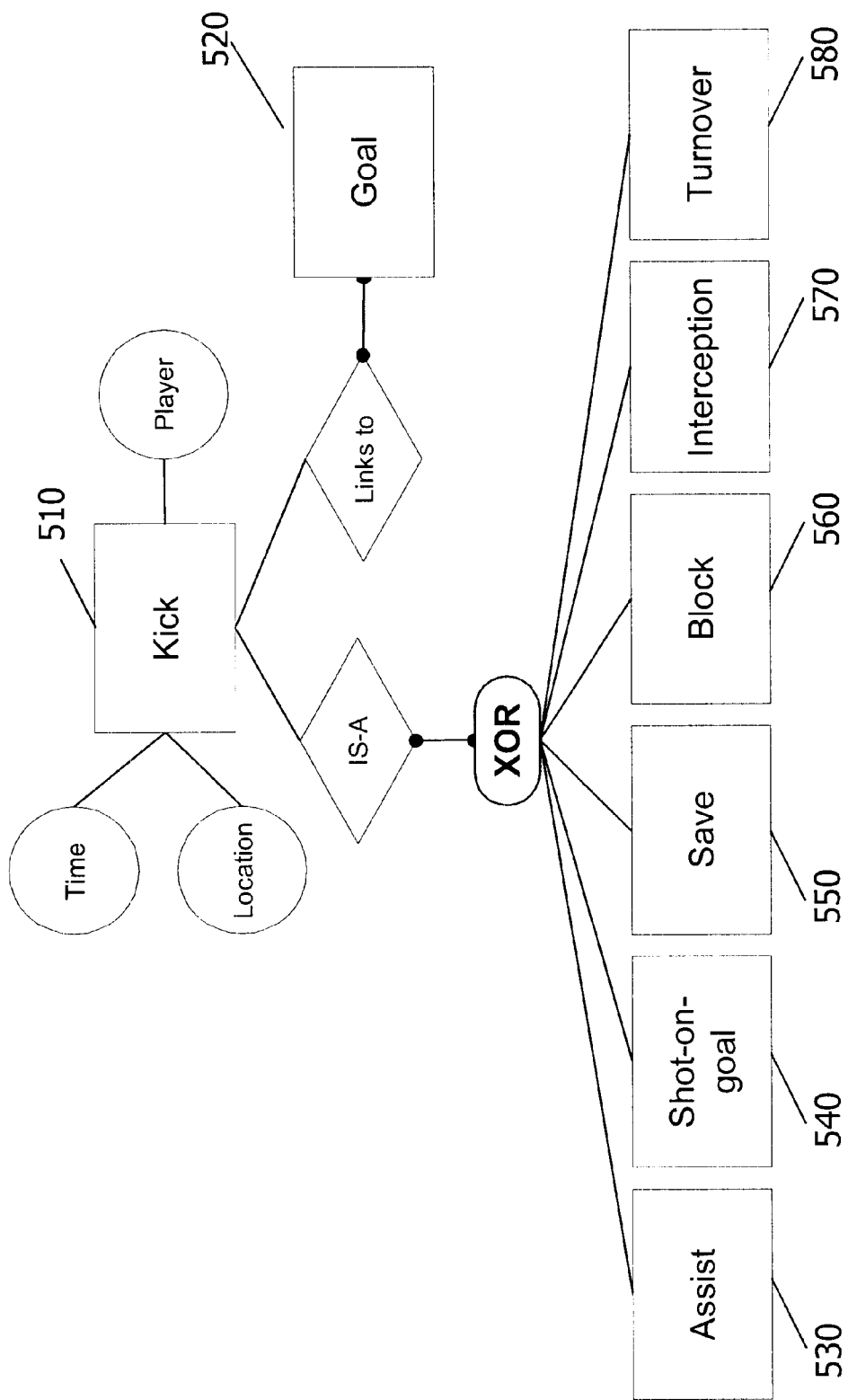
FIG. 5 shows an exemplary model represented by an entity graph, in which relationships among a plurality of events are described.

FIGS. 4 and 5 show two exemplary event models represented as an entity-relationship-diagram for a soccer game. The event model in FIG. 4 describes the knowledge that a "Team Possession" may start with one of certain types of events. For example, Team possession may start with a "throw-in" event 420, a "kick-off" event 430, a "corner kick" event 440, a "free kick" event 450, a "goal kick" event 460, a "penalty kick" event 470, or a "drop ball" event 480. Each event may be associated with a probability, estimated based on, for example, the past game statistics. In the exemplary event model for "Team Possession" shown in FIG. 4, the probabilities associated with four events ("throw-in", "kick off", "corner kick", "free kick", and "drop ball") are all 0.15. The probability associated with event "goal kick" is 0.2 and with event "penalty kick" is 0.05, respectively.

FIG. 4 also shows that "Team Possession" has other properties as well. For example, it has a "begin time" and an "end time" and it is associated with a particular team. The knowledge represented by the model in FIG. 4 is a piece of static knowledge about a soccer game. Such knowledge may be updated based on accumulative experience. For example, the probabilities associated with each of the events that may start with a "Team Possession" may be revised based on a series of detected events.

FIG. 5 illustrates a model 500 for a "kick" event 510 in a soccer game. Model 500 describes the relationship between a "kick" event 510 and a number of possible events. For example, a "kick" event may be classified as one of a "assist" event 530, a "shot-on-goal" event 540, a "save" event 550, a "block" event 560, an "interception" event 570, and a "turnover" event 580. A "kick" event 510 may also be associated with a number of properties such as the "time" and the "location" the "kick" event occurred and the player who kicked the ball. Since a "kick" may also result in a goal, model 500 comprises as well the link between a "kick" event and a particular "goal" event 520.

Figure 6:
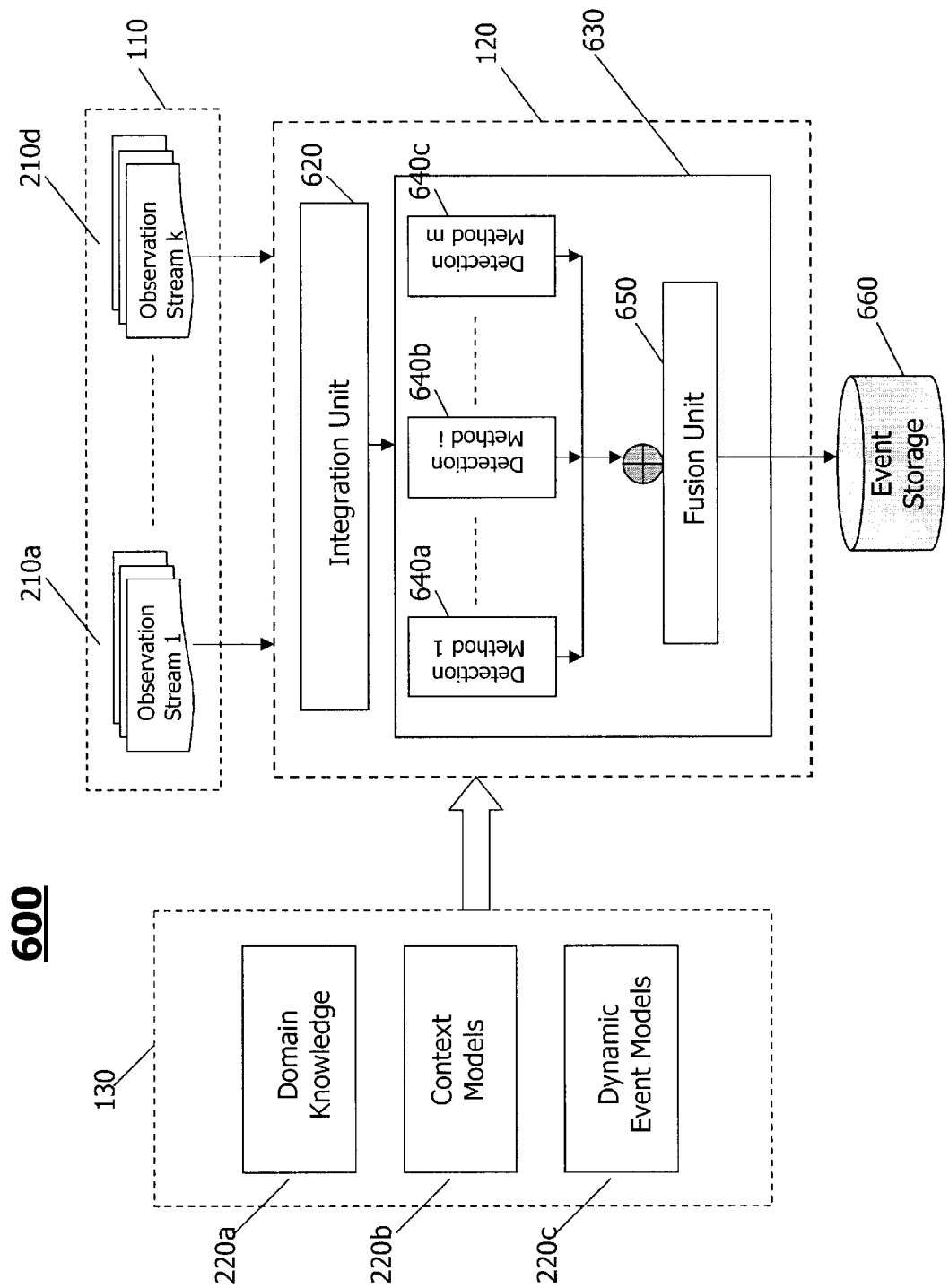
FIG. 6 shows an exemplary detection scheme, in which temporal observations from different data sources are integrated prior to detecting events using a plurality of detection methods.
Figure 7:
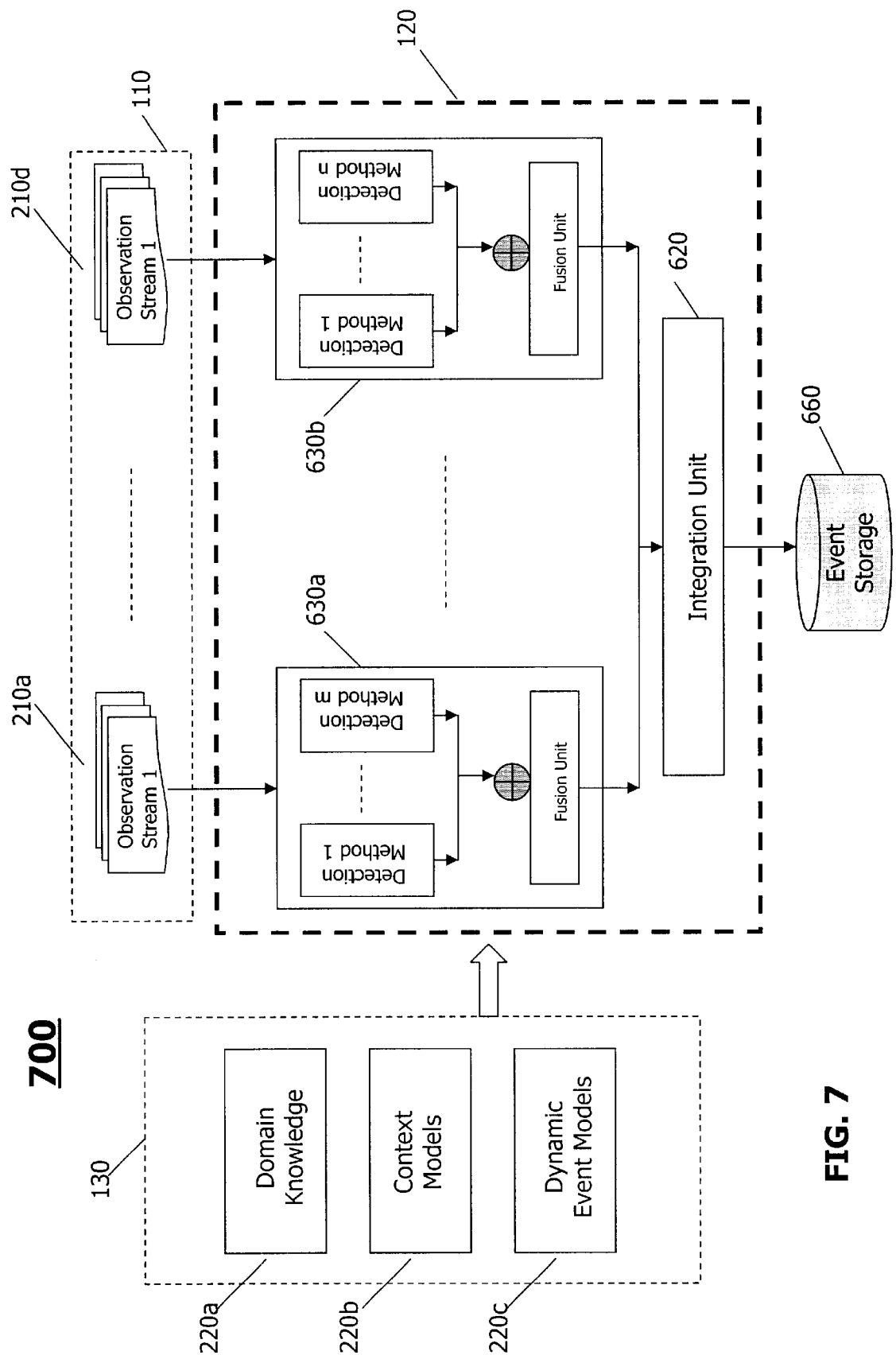
FIG. 7 shows a different exemplary detection scheme, in which a plurality of detection methods are applied to each single data stream and detection results based on different streams are integrated after the detection.

FIG. 6 and FIG. 7 illustrate two different exemplary embodiments of event detection unit 120. In FIG. 6, event detection unit 120 comprises an integration unit 620, a detection unit 630 which further comprises a plurality of detection methods 640a, 640b, 640c, and a fusion unit 650. Integration unit 620 combines different observation streams from different data sources. Different detection methods 640a, 640b, 640c detect a same event using different approaches. Detection results from different detection methods are fused or combined by fusion unit 650 to reach a single detection decision. In FIG. 6, detection unit 630 detects an event based on the integrated observation stream, from integration unit 620, and event models from event modeling unit 130, and then saves detected event in event storage 660.

Observation collection unit 110 provides one or more observation streams 210a . . . 210d to event detection unit 120. As described earlier, observation collection unit 110 may obtain data from different data sources, which may comprise different modalities (e.g., video and audio) or multiple sensors of a single modality. For example, multiple video streams may come from video cameras that are mounted at different locations of a sports stadium. At the same time, a sound recording may be simultaneously performed that records the sound from the stadium. Based on raw data streams, observation collection unit 110 generates useful observations such as the tracking points of a particular sports player in a video and feed such observations, together with synchronized audio data, to event detection unit 120.

When there are observations from different modalities, event detection unit 120 may utilize different modalities to improve detection. For example, a soccer game recording usually comprises both video and sound tracks, corresponding to different modalities. A goal event may be evidenced in both video and audio tracks. That is, a goal event may not only be seen in a video but also be heard (e.g., through crowd cheering) from the audio track. In this case, detecting both the visual evidence as well as the acoustic evidence of a goal event from the observations of different modalities may strengthen the confidence in the detection results.

Different modalities may be integrated in different fashions. The exemplary embodiment of the present invention shown in FIG. 6 integrates observation streams from different modalities before they are used for detection purposes. Such integration may be as simple as concatenating the observations from different data sources at any time instance to form a single observation vector. Integration unit 620 may also implement more intelligent integration schemes such as computing the three dimensional positions of a person, tracked in two dimensional video images, based on observations from multiple cameras and then sends such derived three dimensional positions as integrated observations.

Integrated observations are fed to detection unit 630. In FIG. 6, detection unit 630 may comprise different detection methods that detect, in parallel, a same event at any particular time but using different approaches. For example, detection method 640a may correspond to a rule-based expert system that infers, based on heuristics, the occurrences of an event from input observations. Detection method 640b may correspond to a maximum likelihood estimation approach that estimates the probability for an event to occur based on the likelihood computed based on the event model and the input observations. Each of the detection methods in unit 630 detects underlying event independently. The detection results from those independent detection methods are combined by fusion unit 650 to generate a final (fused) detection result. The detected event is saved in event storage 660.

A different exemplary embodiment for event detection unit 120 is illustrated in FIG. 7, in which a plurality of detection unit 630 (630a, ... 630b) are used. Each detection unit, for example 630a, detects an underlying event based on corresponding event models and a single observation stream. For example, the occurrences of a goal event may be detected by detection unit 630a from observation stream 1 that may provide the positions of a tracked soccer ball in a video. The same occurrences of the goal event may also be detected, in parallel, by detection unit 630b from observation stream k that may provide the acoustic recording of the same soccer game. These two detection units detects the occurrences of the same event based on the observations from different modalities.

Each detection unit may be a plurality of detection methods. The detection methods within a single detection unit (e.g., 630a) detect the occurrences of an event using different approaches. All the detection methods in a single detection unit operate on the same observation stream. The detection results from these detection methods are combined to achieve a detection. For example, to identify the crowd cheering associated with a goal event from acoustic recording of a soccer game, detection method 1 in detection unit 630b may apply neural network approach; while detection method n may apply fuzzy logic approach. Both approaches identify the same event based on the same input data. The fusion unit in 630b combines the results from both detection methods to reach a detection decision.

Detection results with respect to different observation streams may be further integrated to reach a final detection result. In FIG. 7, unit 630a may have detected a goal event based on the tracking ball positions from stream 1 and unit 630b may have detected a goal event based on the crowd cheering identified from observation stream k. Both detect the event based on the data from a single modality (video or audio). If the goal events identified by 630a and 630b (independently from video and audio data) have confidence measures 0.7 and 0.8, respectively, by combining the two, a final detection result generated by integration unit 620 may have a higher confidence measure, for example, of 0.9.

Event detected from different observation streams of the same modality may also be used to improve the overall detection. For example, if two synchronized goal events are independently detected from two single observation streams, each representing the video recording from a camera mounted at a different location of a stadium, the two independent detection results may be integrated to yield a final detection. In this case, even if one of the detection results may be associated with a low confidence due to, for example, poor lighting condition in the video, the combined detection result may yield higher confidence level due to the mutual supporting evidence from different viewing angles in the stadium.

Figure 8:
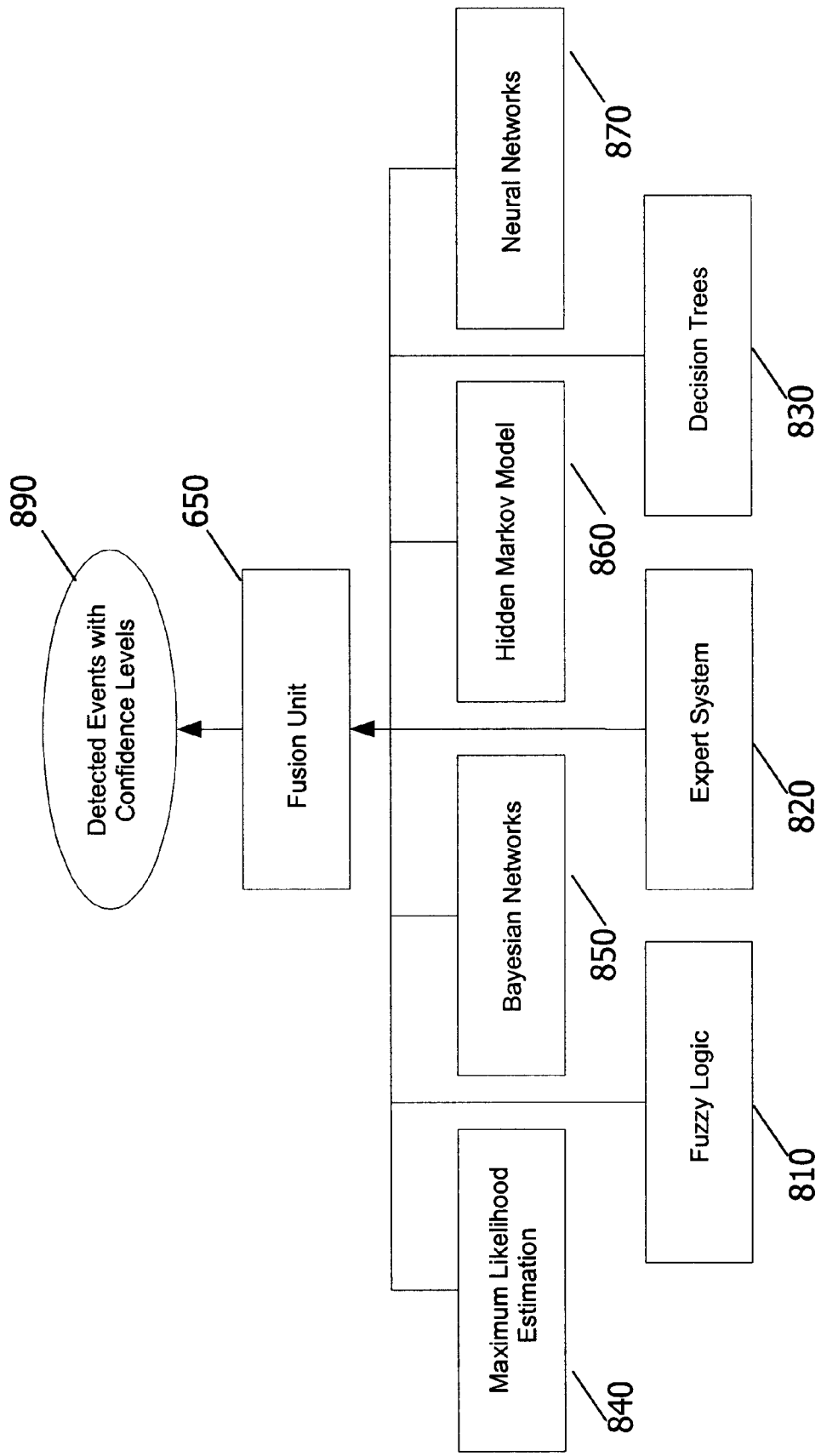
FIG. 8 illustrates a plurality of detection methods that may be applied to event detection.

FIG. 8 illustrates a set of exemplary detection methods that may be used to implement 630a, ... 630b. In FIG. 8, a detection method may be any one of a maximum likelihood estimation method 840, a fuzzy logic method 810, a Bayesian network based method 850, an expert system based method 820, a Hidden Markov Model method 860, a decision tree based method 830, and a neural networks based method 870. The fusion unit 650 may be implemented as a generic function that fuses detection results or as a simple rule based scheme. Fusion unit 650 generates detected events, each of which may be associated with a confidence measure.

Figure 9:
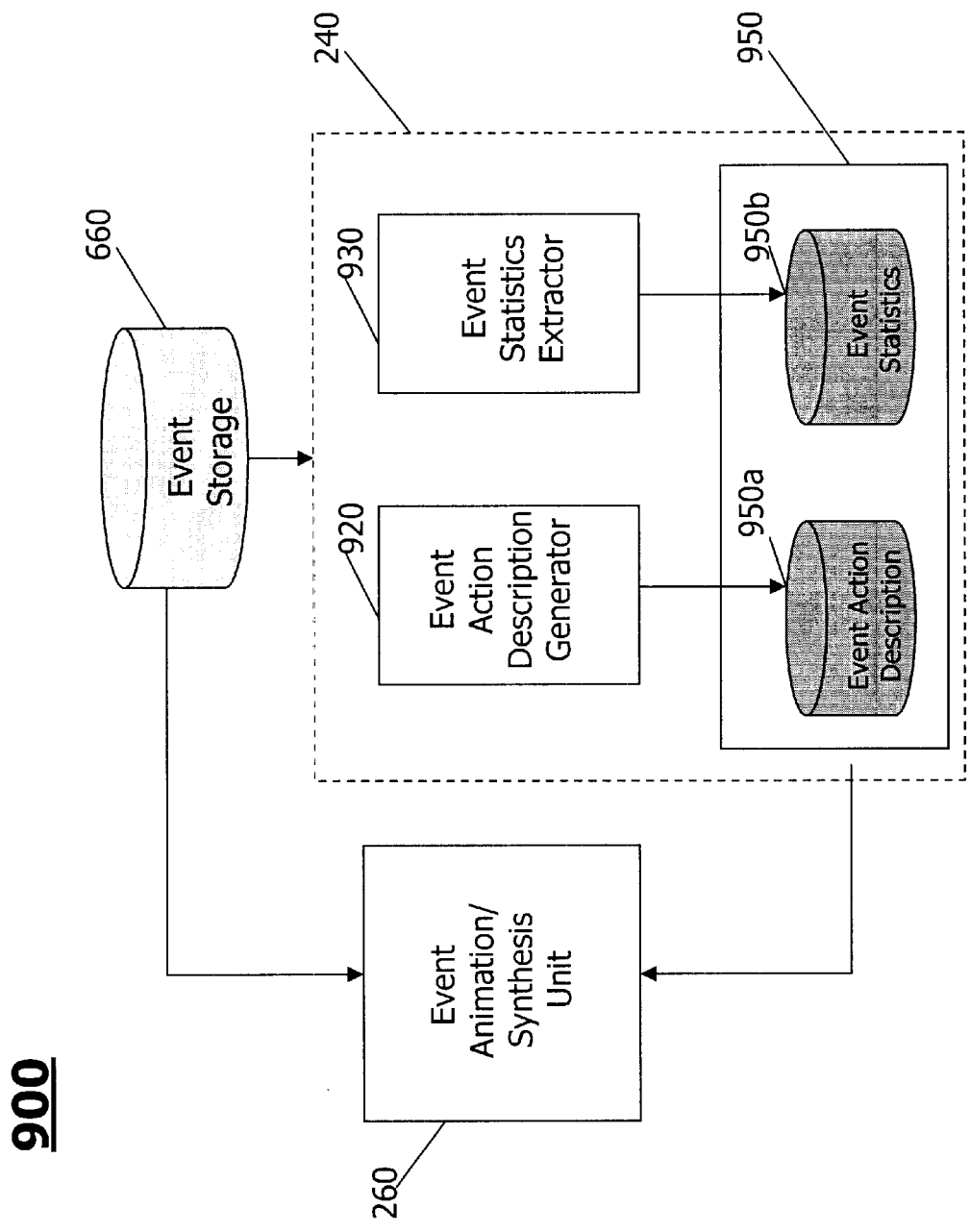
FIG. 9 is a block diagram of event characterization in relation to event animation.

Detected events may be used to generate appropriate characterizations which may subsequently be used for different purposes. FIG. 9 shows an exemplary block diagram of event characterization unit 240, in relation to event animation/synthesis unit 260. Using the detected events stored in event storage 660, event statistics extractor 930 may compute various statistical information from the detected events and save the information in event statistics storage 950b. At the same time, event description generator 920 generates descriptions about certain aspects of the detected events. Generator 920 may identify certain consistent actions occurred n detected events and generate a description about such actions. For example, if a particular player scored goals in a series of detected event, it may be useful to know how many times that the player actually kicked the ball using his left foot. Such description is stored in event action description storage 950a.

Figure 10:
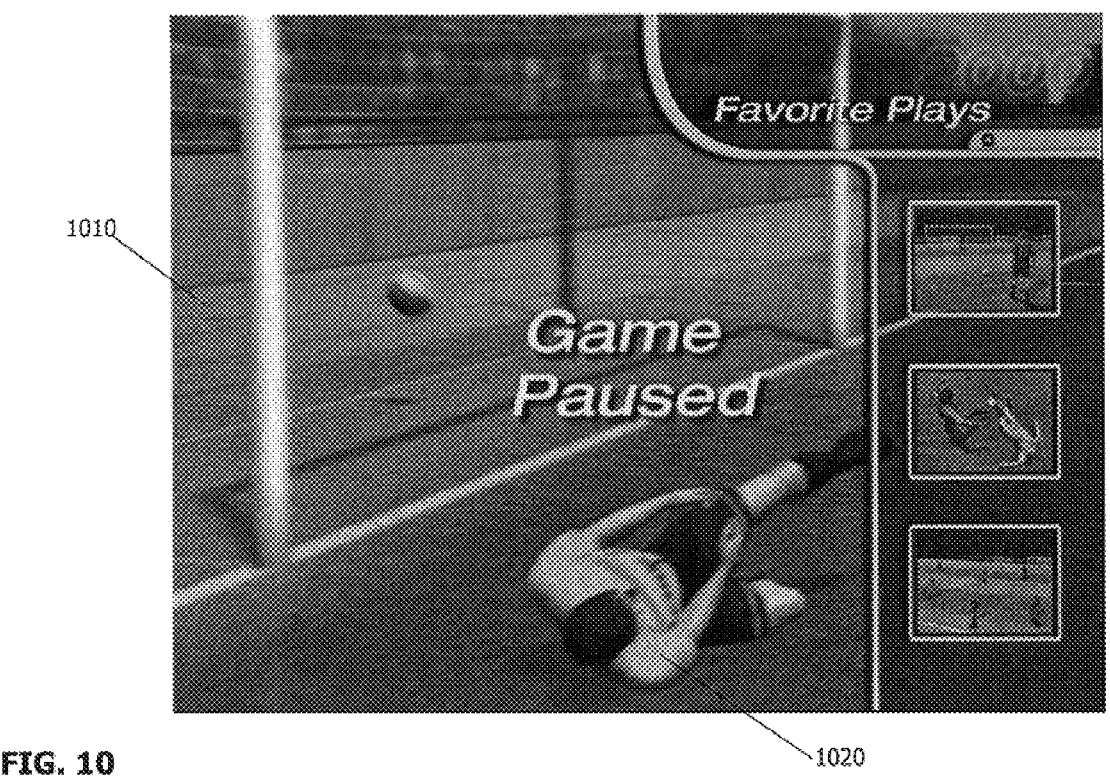
FIG. 10 displays an animated video event.

Descriptions about event actions may be utilized by event animation/synthesis unit 260 for various animation purposes. Based on action descriptions, event animation/synthesis unit 260 may generate animated events and insert or plug in those animated event to a real scene to produce a synthesized event. FIG. 10 shows an example of video synthesis, in which an animated figure 1020 is inserted into a real scene 1010 of a soccer field.

Figure 11:
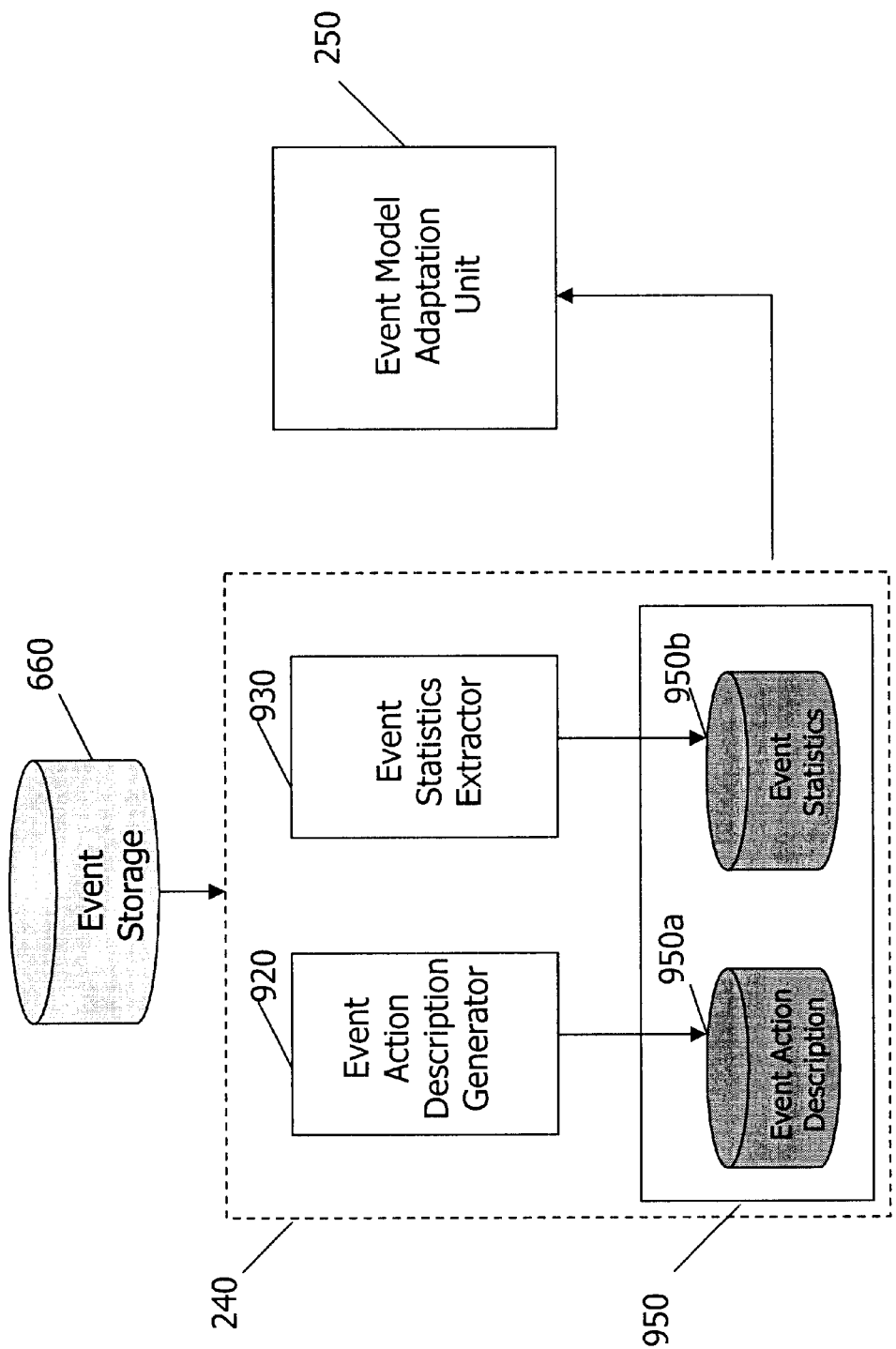
FIG. 11 is a block diagram of event characterization in relation to event model adaptation.
Figure 12:
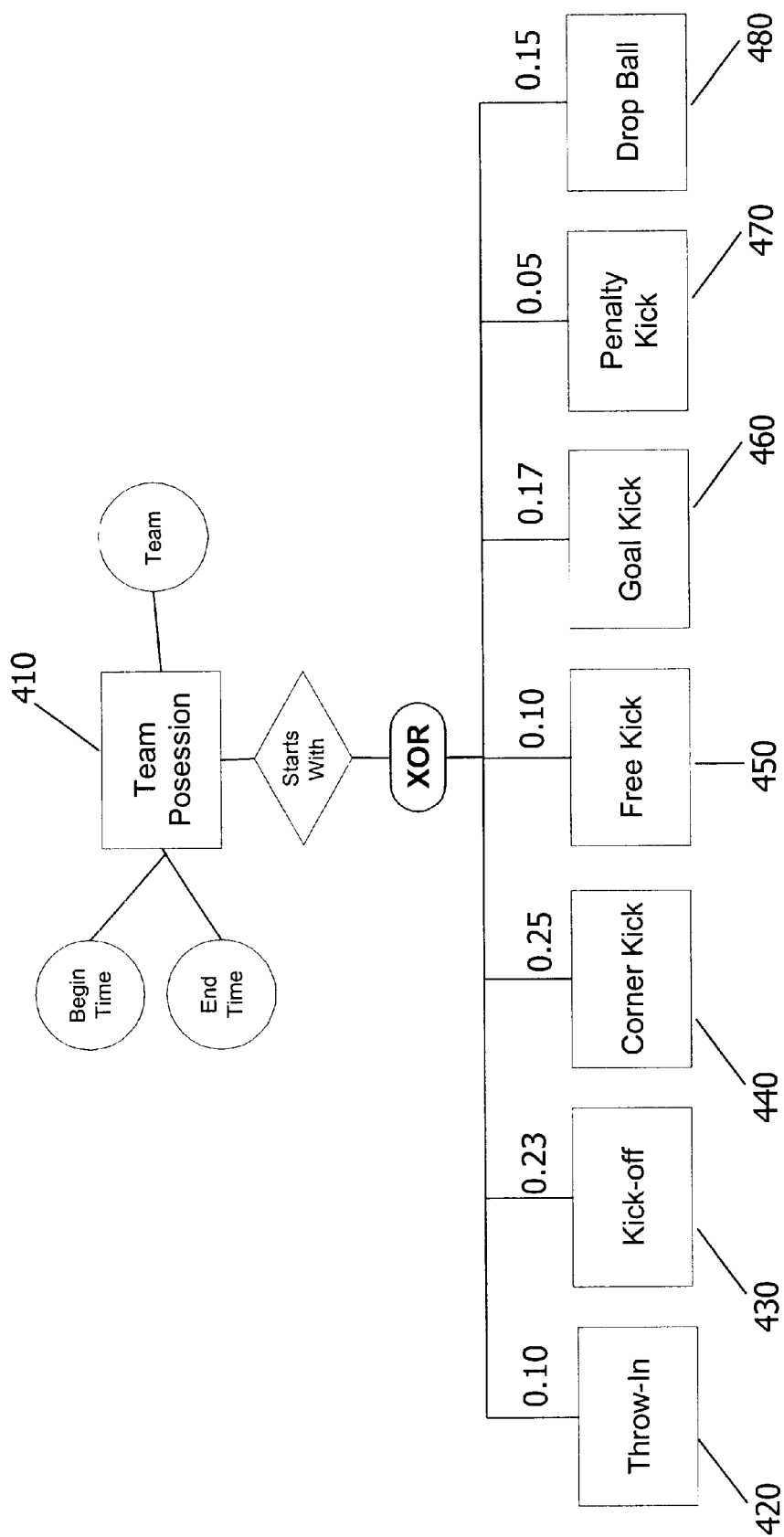
FIG. 12 shows an example how an existing event model may be revised based on event characterization.

Event characterizations may also be used for other purposes. FIG. 11 shows the exemplary relationship between event characterization unit 240 and event model adaptation unit 250. The characterization information stored in 950 may be accessed by event model adaptation unit 250 to determine how to update existing event models. FIG. 12 illustrates an example in which the probabilities associated with various starting situations for "team possession" are updated using the statistics computed based on detected events. In referring to FIG. 4 which shows the exemplary original probabilities associated with various events, the probability associated with "throw-in" is changed from 0.15 to 0.10 and the probability associated with "kick off" is updated from 0.15 to 0.23. Those updates may be due to the fact that detected events have consistently shown that the probability for "team possession" to start with a "kick off" event is larger than the probability to start with a "throw-in" event. In this case, even though the original model, shown in FIG. 4, states equal probability between the two, the characterization about recent events contradicts the original model. The event model adaptation unit 250 may detect the difference and activate the adaptation to update or override the previous model.

Figure 13:
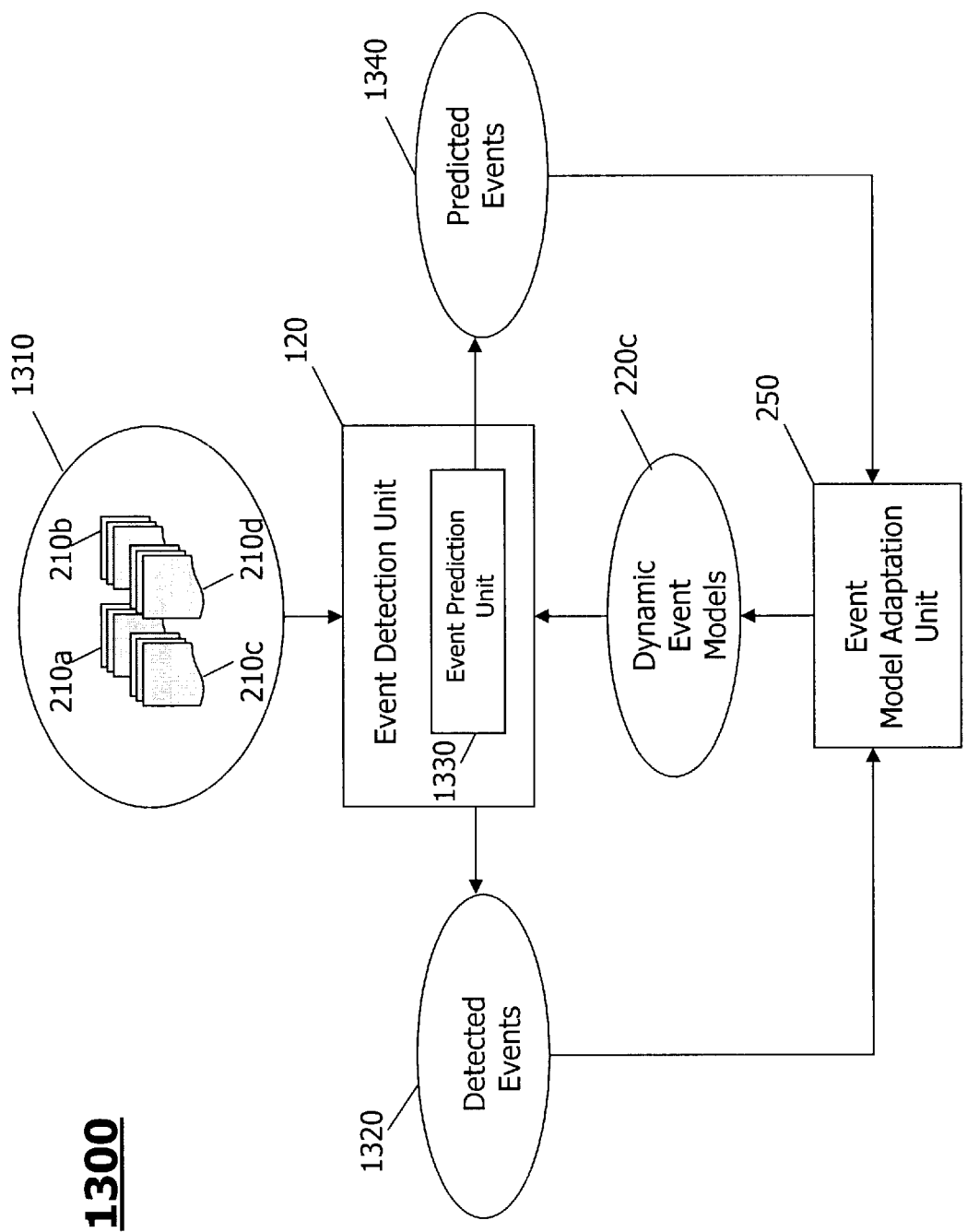
FIG. 13 shows an exemplary block diagram for a scheme that dynamically update an event model based on on-line prediction information.

The adaptation may also happen on-line during event detection. FIG. 13 is an exemplary block diagram that shows how on-line dynamic model adaptation may be realized. In FIG. 13, observation streams 210a, 210b, 210c, 210d are fed into event detection unit 120. Within unit 120, event prediction unit 1330 takes event detection result as input and predicts what events may happen next. Such predicted events 1340 are sent to event adaptation unit 250. Combined with detected events 1320 and predicted events 1340, event adaptation unit 250 determines the strategy to update the corresponding event model, stored in dynamic event model storage 220c.

The update to an existing event model based on predicted events may aim at generating new models that make future detection more targeted. The updated event model will be fed back to event detection unit 120 so that the new model will be used. This is an online feedback process, through which the event detection performed by unit 120 is self adjusting continuously.

Figure 14:
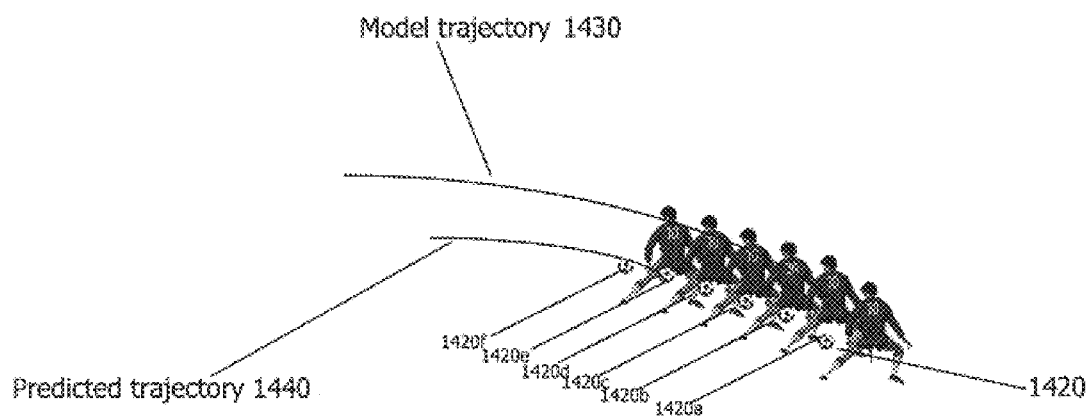
FIG. 14 shows an example of dynamically updating an event model based on on-line event prediction.

FIG. 14 illustrates an example how a dynamic event model can be updated using online predicted event during detection. In FIG. 14, an existing event model describes a model trajectory 1430 for a soccer ball 1420. Based on the positions of the tracked ball 1420a, . . . , 1420f, a ball trajectory 1440 can be predicted based on tracked ball position. Such prediction may be performed by fitting a third order polynomial curve to the ball positions and then extrapolate beyond the available points. When there is enough discrepancy between the model trajectory 1430 and the predicted trajectory 1440, the detection based on the model trajectory may become increasingly difficult and updating model 1430 using the on-line predicted trajectory 1440 may benefit the detection.

The semantic events detected using framework 100 may benefit different applications. For example, a sports team may use the statistics computed based on detected events to learn from success or mistakes to improve. The detected events may also be used to index the raw data to facilitate content based query and retrieval.

Figure 15:
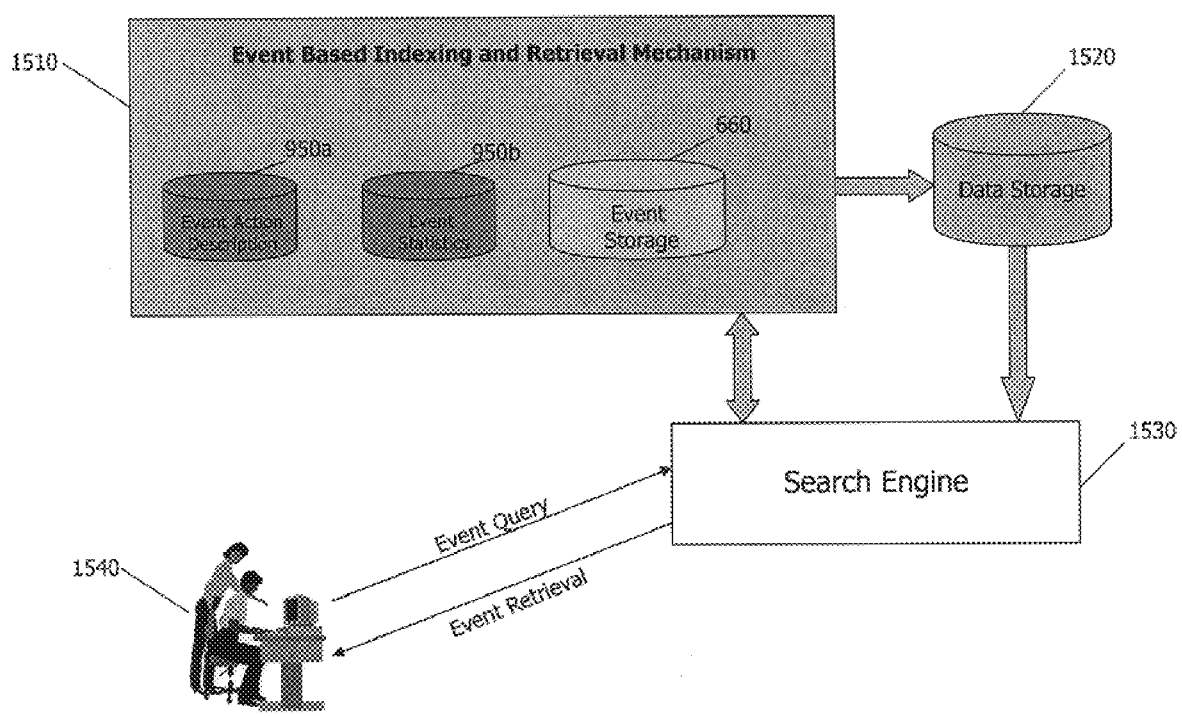
FIG. 15 shows an exemplary use of the present invention.

FIG. 15 illustrates an example of such use. In FIG. 15, semantic event based indexing and retrieval mechanism 1510 builds indices to raw data stored in data storage 1520 based on detected events 660, event statistics 950b, and event action descriptions 950a. With those indices, an end user 1540 may issue queries about certain events. Such queries may be sent to a search engine 1530 to search for the events that satisfy the criteria specified in the queries. Search engine retrieve desired events from data storage 1520 using event based indices stored in 1510. The retrieved events are sent back to end user 1540 so that they can be displayed or manipulated.

When data volume is huge, such indices enable much more efficient retrieval. For example, if stored raw data in data storage 1520 is video data of a soccer game, retrieving a particular segment of the game video that contains the goal event scored by a particular player may be extremely inefficient without proper index. Therefore, with such event based indices, an end user can retrieve only the desired portion of the raw data that contains relevant information with efficiency.

The search engine 1530 may also retrieve information directly from indexing and retrieval mechanism 1510. For example, event statistics may be retrieved by a coach of a sports team for performance review. End user 1540 may also request only event action description information 950a. If event animation/synthesis unit 260 is installed on the end user's machine, the retrieved event action description can be used to generate animations.

The processing described above may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for detecting a semantic temporal event, said method comprising:

retrieving multiple-layer models corresponding to said semantic temporal event;

receiving temporal observations that are extracted, from at least one data source, according to said multiple-layer models for the semantic temporal event;

detecting one or more occurrences of the semantic temporal event based on said temporal observations and said multiple-layer models by supplying said temporal observations to said multiple-layer models;

characterizing said one or more occurrences of the semantic temporal event, detected by said detecting, to produce a characterization;

storing said characterization;

performing temporal event prediction based on said characterization;

revising said multiple-layer models for said semantic temporal event based on said characterization; and simulating parts of said semantic temporal event according to said characterization.

2. The method according to claim 1, wherein said semantic temporal event includes a sports event.

3. The method according to claim 2, wherein said sports event includes a soccer game.

4. The method according to claim 1, wherein said multiple-layer models include a high level domain-specific knowledge model and a dynamic hierarchical event model.

5. The method according to claim 4, wherein said high level domain-specific knowledge model includes rules of a sports game.

6. The method according to claim 4, wherein said dynamic hierarchical event model includes a hierarchical decision tree.

7. The method according to claim 4, wherein said dynamic hierarchical event model includes an entity-relationship-diagram.

8. The method according to claim 1, wherein said at least one data source includes at least one data acquisition device including a camera, a microwave sensor, a sound recorder, and an input data stream selected from the group consisting of video, audio, text, and temporal features.

9. The method according to claim 8, wherein said temporal features include tracking position data.

10. The method according to claim 1, wherein said detecting comprises:

performing semantic temporal event detection using a plurality of detection methods, each of said plurality of detection methods producing a detection result; and combining said detection results with each other to produce a final detection.

11. The method according to claim 10, wherein said plurality of detection methods includes dynamic Bayesian networks, rule based expert systems, decision trees, Hidden Markov Models, neural networks, or fuzzy logic.

12. The method according to claim 1, wherein said characterization includes:

a set of statistics computed from said one or more occurrences; or a set of descriptions, each of which describes an action happening in an occurrence of the semantic temporal event.

13. A computer-readable medium for programming a computer to detect a semantic temporal event, comprising instructions for:

retrieving multiple-layer models corresponding to said semantic temporal event;

receiving temporal observations that are extracted, from at least one data source, according to said multiple-layer models for the semantic temporal event;

detecting one or more occurrences of the semantic temporal event based on said temporal observations and said multiple-layer models;

characterizing said one or more occurrences of the semantic temporal event, detected by said detecting, to produce a characterization;

storing said characterization;

performing temporal event prediction based on said characterization;

revising said multiple-layer models based on said characterization; and simulating parts of said semantic temporal event according to said characterization.

14. The computer-readable medium according to claim 13, wherein said semantic temporal event includes a sports temporal event.

15. The computer-readable medium according to claim 13, wherein said semantic temporal event includes a soccer game.

16. The computer-readable medium according to claim 13, wherein said multiple-layer models include a high level domain-specific knowledge model and a dynamic hierarchical event model.

17. The computer-readable medium according to claim 16, wherein said high level domain-specific knowledge model includes rules of a sports game.

18. The computer-readable medium according to claim 13, wherein said detecting comprises:

performing semantic temporal event detection using a plurality of detection methods, each of said plurality of detection methods producing a detection result; and combining said detection results with each other to produce a detection.

19. The computer-readable medium according to claim 18, wherein said plurality of detection methods includes dynamic Bayesian networks, rule based expert systems, decision trees, Hidden Markov Models, neural networks, or fuzzy logic.

20. The computer-readable medium according to claim 13, wherein said characterization includes:

a set of statistics computed from said one or more occurrences; or a set of descriptions, each of which describes an action happening in an occurrence of the semantic temporal event.

* * * * *